Nov. 3, 1953

A. E. YOUNG 2,657,557

SLIP CLUTCH

Original Filed July 25, 1946

INVENTOR
AUSTIN E. YOUNG
BY
ATTORNEYS

Nov. 3, 1953     A. E. YOUNG     2,657,557
SLIP CLUTCH
Original Filed July 25, 1946     2 Sheets-Sheet 2
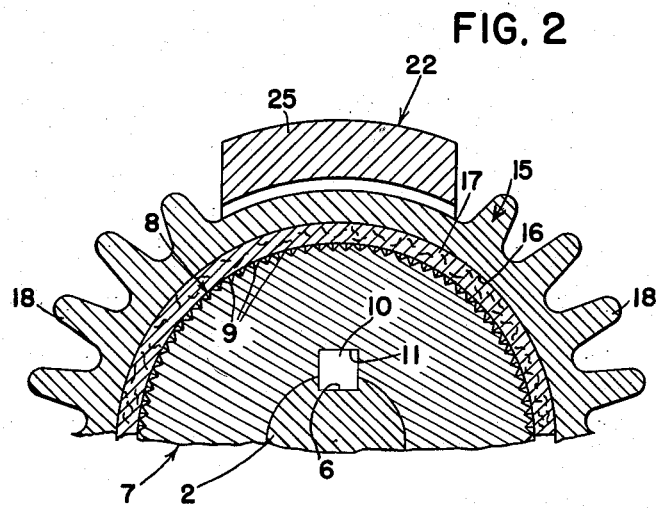
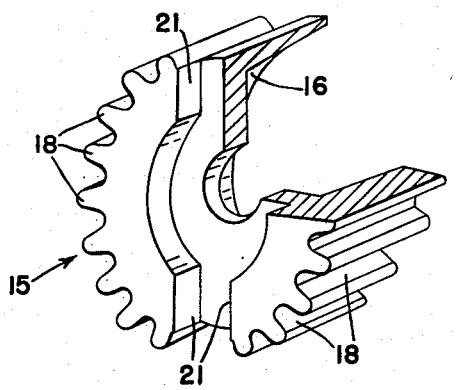
INVENTOR
AUSTIN E. YOUNG
BY
ATTORNEYS Patented Nov. 3, 1953

2,657,557

UNITED STATES PATENT OFFICE 2,657,557

SLIP CLUTCH

Austin E. Young, Syracuse, N. Y., assignor, by mesne assignments, to Deere & Company, Moline, Ill., a corporation of Illinois Continuation of application Serial No. 686,187, July 25, 1946. This application August 10, 1951, Serial No. 241,296

5 Claims. (Cl. 64—30)

This application is a continuation of my copending application, Serial No. 686,187, filed July 25, 1946, now abandoned.

The present invention relates generally to agricultural implements and more particularly to slip clutches employed to take care of abnormal overloads and prevent damage to parts of the implement.

The object and general nature of the present invention is the provision of a new and improved slip clutch structure of the friction type. More particularly, it is an important feature of this invention to provide a slip clutch structure in which a resilient rubber-like collar is employed as the resilient element yieldably holding the friction members in normally engaged driving relation, and more specifically, it is a feature of this invention to provide a resilient rubber-like collar arranged to be compressed for not only holding the clutch elements in engagement and accommodate their slipping but, additionally, to provide new and improved sealing means for retaining lubricant between the relatively rotatable parts.

Another feature of this invention is the provision of a new and improved slip clutch of the friction type wherein the heat generated during slipping is readily dissipated.

These and other objects and advantages of the present invention will be apparent to those skilled in the art after a consideration of the following detailed description of the preferred embodiment, taken in conjunction with the accompanying drawings.

In the drawings:

Figure 2 is a fragmentary section taken along the line 2—2 of Figure 1.

Figure 3 is a perspective view of one part of the friction clutch.

Figure 1:
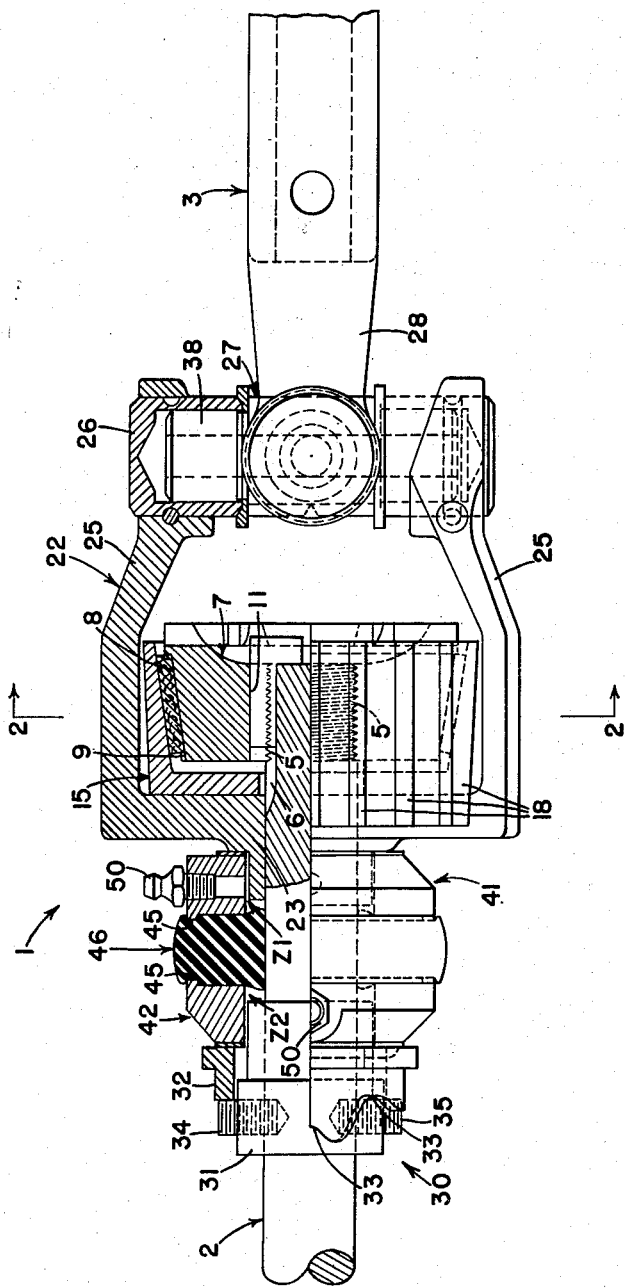
Figure 1 is a generally longitudinal vertical section taken through a slip clutch construction in which the principles of the present invention have been incorporated.

As shown in Figure 1, the slip clutch construction, indicated in its entirety by the reference numeral 1, serves to connect a driving shaft 2 with a driven shaft 3, although it will be understood that the latter shaft may be the driving shaft and shaft 2 the driven shaft, where desired. The driving shaft 2 at its inner end is threaded, as at 5, and provided with a keyway 6, the inner end of the shaft receiving a clutch cone member 7 having an outer generally conical surface 8. The outer surface 8 is formed with a plurality of serrations 9 for a purpose which will be referred to in detail below. The member 7 is preferably formed as a casting and the serrated outer conical surface 8 is preferably used as cast so that no machining or the like is required. A key 10 is disposable in the slot 6 and in a companion slot 11 formed in the clutch cone member 7, for the purpose of locking the latter in position on the shaft 2.

Cooperating with the clutch cone member 7 is a clutch cup member 15 having an inner friction surface 16 with a friction lining 17 disposed between the surfaces 8 and 16. The lining need not be fastened to either of the members 7 and 15, yet all slippage takes place between the lining 17 and the surface 16, since the surface 8 is roughened, causing the lining to always rotate with the inner member. Thus, most of the heat is generated, during slippage, in the cup member 15. The latter member has fins 18 which, being on the outside, readily dissipate the heat generated so that the inner conical member 7 remains comparatively cool, the lining 17 serving as insulation therefor. Also, the efficiency of the clutch is increased since the slippage takes place on the larger outside diameter of the lining 17, rather than on the smaller inside diameter.

The clutch cup member 15 is notched, as at 21, to receive the adjacent portions of a yoke member 22. The latter member is provided with a central hub section 23 mounted for rotation on the shaft 2 just behind the clutch cup member 15. The member 23 also includes yoke arms 25 which terminate in apertured ends receiving a pair of bearing members 26 in which the arms 38 of a universal joint spider 27 is mounted for rocking movement. The spider 27 has a second pair of arms receiving similar bearings carried by arms 28 that form a part of or are connected to the shaft 3.

An abutment member 30 is fixed to the shaft 2 in spaced relation with respect to the yoke member 22 and preferably comprises two parts, one including a central sleeve section 31 and the other an adjustable ring 32, the axial position of which, relative to the sleeve section 31, may be varied by turning the collar 32 so as to bring selected notches 33 into a position to embrace either or both of the set screws 34 and 35.

A thrust collar 41 is mounted for rotation on the hub portion 23 of the yoke member 22, and a similar thrust collar 42 is mounted for rotation on the abutment member 30. Each of these collars 41 and 42 is provided with a rib 45 facing axially inwardly, and a resilient collar 46 formed of rubber-like material is disposed between the thrust collars 41 and 42 in a compressed state. The member 46 thus acts as a resilient element against the collar 42 and yoke 22 to press the clutch cup 15 against the cooperating clutch cone 7 for frictionally connecting them together so that as the shaft 2 is rotated the yoke member 22 and the shaft 3 are also rotated in consequence thereof. In the event of an overload, one of the elements slips with respect to the other but without requiring appreciable axial displacement of the yoke member 22.

Each of the thrust collars 41 and 42 is provided with a lubricant fitting 50 extending into an opening in the associated collar to receive it, thus forming a lubricant zone indicated in the drawing by reference characters Z1 and Z2, respectively. Lubricant in the zone Z1 serves to lubricate the bearing surfaces on the shaft 2 and hub section 23 of the yoke 22, and also the bearing surfaces on the hub 23 and the thrust collar 41. Lubricant in zone Z2 serves to lubricate the bearing surfaces on the thrust collar 42 and the adjacent portions of the abutment 30 receiving the collar 42. Preferably, the member 46 is normally compressed, by adjusting the collar 42, and/or adjusting the clutch cone member 7 on the inner end of the shaft 2, so that the material of the resilient ring 46 is pressed not only against the inner faces of the thrust rings 41 and 42 but also firmly against the portions of the shaft 2 between the thrust collars 41 and 42. Thus, the resilient member 46 separates the two lubricant zones Z1 and Z2 and, additionally, serves to prevent any loss of lubricant from the zone Z1 outwardly along the shaft 2. It will be understood that when an overload occurs and the yoke member 22 slips relative to the shaft 2, relative rotation between the hub 23 of the yoke member 22 and the thrust collar 41 takes place and it is therefore important to provide means for maintaining adequate lubrication between these parts. Relative movement may also take place between the thrust collar 42 and the abutment member 30 that is fixed to the shaft. Likewise, the member 46 prevents leakage of lubricant from zone Z2 forwardly along the shaft 2. It will be understood that coarse adjustments of the amount of compression or force exerted by the resilient member 46 may be effected by turning the collar 32 and that finer adjustments in the compression of the member 46 may be effected by removing the key 9 and turning the clutch cone member 7 on the shaft 2. It will also be noted that the resilient compressible element 46 is spaced appreciably from the friction elements 7 and 15 and is therefore protected from being overheated by any long continued slippage.

While I have shown and described above the preferred structure in which the principles of the present invention may be incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a slip clutch construction, a shaft, a first friction member fixed to the end of said shaft, a second friction member, a part carrying said second friction member and mounted for rotation on said shaft, said second friction member being disposed normally in frictional contact with said first friction member, said part having a hub portion, a generally cylindrical collar having a radially inner surface mounted for rotation on the hub portion of said part and having bearing contact therewith so as to accommodate rotation of said part relative thereto, a lubricant fitting carried by said collar for supplying lubricant to said contacting surfaces, an abutment on said shaft, and a resilient rubber-like part compressed between said abutment and collar and bearing, by virtue of said compression, against said shaft adjacent the zone of contact of said part with the shaft, so as to cooperate with said collar to prevent loss of lubricant from said contacting bearing surfaces.

2. A slip clutch for connecting two shafts or the like, comprising a pair of friction elements, including a clutch cone fixed to one end of one shaft and a clutch cup embracing said clutch cone and rotatably mounted on said shaft, a yoke member having an apertured hub portion embracing said one shaft at the side of said clutch cup opposite said clutch cone, said yoke member having arms embracing said clutch cup and clutch cone, said arms being disposed relatively closely adjacent said clutch cup, the latter having sets of cooling fins extending outwardly therefrom except at points underneath said arms, means establishing a driving connection between said yoke member and said clutch cup, said means being arranged so as to hold said yoke and clutch cup in position one relative to the other so that said arms pass between said sets of cooling fins, and means urging said friction elements into contact with one another.

3. A slip clutch comprising an inner conical member having an outer roughened surface, a substantially conical lining of friction material substantially encircling said surface, an outer cup member embracing said conical member and having an inner conical surface appreciably smoother than said outer roughened surface on the inner conical member and disposed in contact with the outer face of said friction lining, said lining being held against movement relative to the inner member only by the roughness of the outer surface of said inner casting member, and cooling vanes on said outer member.

4. A slip clutch comprising an inner member having an outer roughened surface, a lining of friction material substantially encircling said roughened surface, an outer member embracing said inner member and having an inner surface smoother than said roughened surface on the inner clutch member and disposed in contact with the outer face of said friction lining, said lining being held against movement relative to the inner member only by virtue of the outer surface of said inner member being rougher than the inner surface of said outer member, and cooling vanes on said outer member.

5. A slip clutch for connecting two shafts or the like, comprising a pair of friction elements, including an inner clutch element fixed to one end of one shaft and an outer clutch element embracing said inner clutch element and rotatably mounted on said shaft, a yoke member having an apertured hub portion embracing said one shaft at one side of said outer clutch element, said yoke member having arms embracing said inner and outer clutch elements, said arms being disposed relatively closely adjacent said outer clutch element, the latter having a set of cooling fins extending outwardly therefrom except at points underneath said arms, means establishing a driving connection between said yoke member and said outer clutch element, said means being arranged so as to hold said yoke and outer clutch element in position one relative to the other so that said arms pass between said sets of cooling fins, and means urging said friction elements into contact with one another.

AUSTIN E. YOUNG.

References Cited in the file of this patent
UNITED STATES PATENTS

| Number | Name | Date |
|---|---|---|
| 420,512 | Holt | Feb. 4, 1890 |
| 886,601 | Hafelfinger | May 5, 1908 |
| 2,390,908 | Young | Dec. 11, 1945 |
| 2,428,973 | Kelsey | Oct. 14, 1947 |